US010063904B2

(12) United States Patent
Morales et al.

(10) Patent No.: US 10,063,904 B2
(45) Date of Patent: Aug. 28, 2018

(54) INTERCHANGEABLE REAR SEAT INFOTAINMENT SYSTEM

(71) Applicant: VOXX INTERNATIONAL CORPORATION, Hauppauge, NY (US)

(72) Inventors: Mike Morales, Orlando, FL (US); Robb Groner, Sanford, FL (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 15/395,350

(22) Filed: Dec. 30, 2016

(65) Prior Publication Data
US 2017/0195708 A1 Jul. 6, 2017

Related U.S. Application Data

(60) Provisional application No. 62/272,997, filed on Dec. 30, 2015.

(51) Int. Cl.
*H04N 7/18* (2006.01)
*H04N 21/414* (2011.01)
(Continued)

(52) U.S. Cl.
CPC .. *H04N 21/41422* (2013.01); *H04M 1/72527* (2013.01); *H04N 21/4126* (2013.01); *H04N 21/41407* (2013.01); *H04N 21/43635* (2013.01); *H04N 21/43637* (2013.01); *H04N 21/6143* (2013.01); *H04M 1/7253* (2013.01); *H04M 2250/02* (2013.01)

(58) Field of Classification Search
CPC ....... H04N 21/41422; H04N 21/43635; H04N 21/43637; H04N 21/6143; H04N 21/4126; H04N 21/41407
USPC ..................................................... 725/25, 75
See application file for complete search history.

(56) References Cited

U.S. PATENT DOCUMENTS 6,240,414 B1 * 5/2001 Beizer ............... G06F 17/30176
7,836,472 B2 * 11/2010 Brady, Jr. .............. H04H 20/62
725/115
(Continued)

OTHER PUBLICATIONS

ISA Search Report dated Mar. 13, 2017 for Corresponding Application PCT/US2016/069494.
(Continued)

*Primary Examiner* — Michael B Pierorazio
(74) *Attorney, Agent, or Firm* — F. Chau & Associates, LLC

(57) ABSTRACT

A rear seat entertainment system includes an access point and a second housing. The access point includes a first screen and input/output ports. The access point is included in a first housing. The second housing is separate from the first housing and includes a second screen. The access point is configured to display first content on the first screen and stream the first content displayed on the first screen to the second housing so that the first content is displayed on the first and second screens. The access point is further configured to receive second content from a mobile device, display the second content on the first screen and stream the second content displayed on the first screen to the second housing so that the second content is displayed on the first and second screens.

19 Claims, 6 Drawing Sheets

(51) Int. Cl.
*H04M 1/725* (2006.01)
*H04N 21/41* (2011.01)
*H04N 21/4363* (2011.01)
*H04N 21/61* (2011.01)

(56) References Cited

U.S. PATENT DOCUMENTS

| | | | | |
|---|---|---|---|---|
| 7,984,190 B2* | 7/2011 | Rhoads | | H04L 67/06 709/248 |
| 8,176,363 B2* | 5/2012 | Zlotnick | | G06F 11/2082 711/161 |
| 8,649,161 B2* | 2/2014 | Kato | | B60R 11/0235 224/483 |
| 9,041,670 B2* | 5/2015 | Kobayashi | | G06F 3/0488 345/156 |
| 9,083,581 B1* | 7/2015 | Addepalli | | H04W 4/046 |
| 9,226,000 B1* | 12/2015 | Knight | | H04N 21/2146 |
| 2004/0045038 A1 | 3/2004 | Duff et al. | | |
| 2006/0107295 A1* | 5/2006 | Margis | | H04N 7/163 725/81 |
| 2006/0174285 A1* | 8/2006 | Brady, Jr. | | A63F 13/12 725/76 |
| 2007/0106771 A1* | 5/2007 | Lucash | | H04L 67/1095 709/223 |
| 2007/0250873 A1* | 10/2007 | Ohyama | | H04L 29/06027 725/82 |
| 2008/0016081 A1* | 1/2008 | MacMillan | | G06F 17/30035 |
| 2008/0016196 A1* | 1/2008 | MacMillan | | G06F 17/30017 709/223 |
| 2009/0077595 A1* | 3/2009 | Sizelove | | G06F 1/1626 725/76 |
| 2009/0119721 A1* | 5/2009 | Perlman | | H04N 7/24 725/76 |
| 2010/0257475 A1 | 10/2010 | Smith et al. | | |
| 2011/0167460 A1* | 7/2011 | Tranchina | | B60N 2/4876 725/75 |
| 2012/0112694 A1* | 5/2012 | Frisch | | B60L 11/1824 320/109 |
| 2013/0093958 A1* | 4/2013 | Yoshikawa | | G01C 21/3661 348/705 |
| 2013/0144487 A1* | 6/2013 | Suzuki | | G06F 17/00 701/36 |
| 2013/0298172 A1 | 11/2013 | Chang | | |
| 2014/0013364 A1* | 1/2014 | Vondoenhoff | | B64D 11/0015 725/77 |
| 2014/0059184 A1* | 2/2014 | Bird | | H04H 20/62 709/219 |
| 2014/0074918 A1* | 3/2014 | Wang | | H04L 67/104 709/203 |
| 2014/0237517 A1 | 8/2014 | Tranchina | | |
| 2014/0237518 A1 | 8/2014 | Liu | | |
| 2014/0366125 A1* | 12/2014 | Murata | | H04W 12/06 726/17 |
| 2015/0245109 A1* | 8/2015 | Couleaud | | H04N 21/2146 725/77 |
| 2015/0334441 A1* | 11/2015 | Sukegawa | | H04N 21/436 725/25 |

OTHER PUBLICATIONS

PCT International Preliminary Report on Patentability, dated Feb. 15, 2018, in corresponding PCT Application No. PCT/US16/69494.

* cited by examiner

INTERCHANGEABLE REAR SEAT INFOTAINMENT SYSTEM

CROSS-REFERENCE TO RELATED APPLICATION

This application claims priority under 35 U.S.C. § 120 to U.S. provisional application No. 62/272,997, filed Dec. 30, 2015, the disclosure of which is incorporated by reference herein in its entirety.

TECHNICAL FIELD

The present invention relates to in-car entertainment or in-vehicle infotainment.

DISCUSSION OF RELATED ART

In-car entertainment (ICE), or in-vehicle infotainment (IVI), is a collection of hardware and software in automobiles that provides audio or video entertainment. In car entertainment originated with car audio systems that consisted of radios and cassette or compact disc (CD) players, and now includes automotive navigation systems, video players, universal serial bus (USB) and Bluetooth connectivity, Carputers, in-car internet, and WiFi. Once controlled by simple dashboards, knobs and dials, ICE systems can include steering wheel audio controls and handsfree voice control.

SUMMARY OF THE INVENTION

According to an exemplary embodiment of the present invention, there is provided a rear seat entertainment system including: a first access point, wherein the first access point includes a first display screen and a plurality of input/output ports, and wherein the first access point is included in a first housing; and a second housing separate from the first housing, wherein the second housing includes a second display screen, wherein the first access point is configured to display first content on the first display screen and stream the first content displayed on the first display screen to the second housing so that the first content is simultaneously displayed on the first and second display screens, and wherein the first access point is further configured to receive second content from a first mobile device, display the second content on the first display screen and stream the second content displayed on the first display screen to the second housing so that the second content is simultaneously displayed on the first and second display screens.

The first and second housings are each configured to be disposed inside a vehicle seat headrest.

The first and second housings are each configured to be mounted to a vehicle seat.

The plurality of input/output ports include a high-definition multimedia interface (HDMI) port, a universal serial bus (USB) port, an analog audio output port and a secure digital (SD) card port.

The first access point further includes a digital video disc (DVD) player.

The rear seat entertainment system further includes an infrared remote control.

The first access point is further configured to stream the first content displayed on the first display screen to the first mobile device so that the first content is simultaneously displayed on the first display screen, and a third display screen of the first mobile device.

The first access point is further configured to stream the first content displayed on the first display screen to a second mobile device so that the first content is simultaneously displayed on the first display screen, the third display screen of the first mobile device, and a fourth display screen of the second mobile device.

The first mobile device is a smartphone or a tablet.

The second housing includes a second access point, wherein the second access point is configured to stream third content to a second mobile device so that the third content is displayed on a third display screen of the second mobile device.

According to an exemplary embodiment of the present invention, there is provided a vehicle entertainment system including: a master device, the master device including a first display screen and a plurality of input/output ports; and a first satellite device, the first satellite device including a second display screen, wherein the master device is configured to receive a hardwired connection via one of the plurality of input/output ports from a first portable device, receive first video content from the first portable device through the hardwired connection, display the first video content on the first display screen and wirelessly stream the first video content to the second display screen, and wherein the master device is further configured to stream the first video content to a second mobile device.

The master device and the satellite device are each configured to be disposed inside a vehicle seat headrest.

The master device and the first satellite device are each configured to be mounted to a vehicle seat.

The master device is further configured to receive second video content via a WiFi connection and wirelessly stream the second video content to the first mobile device or the second mobile device.

Content streaming operations of the master device are controllable with the first or second mobile devices.

The master device is configured to establish a dedicated in-car wireless network.

At least one of the first mobile device and the second mobile device is a smartphone or a tablet.

The master device further includes a plurality of input/output ports, wherein the plurality of input/output ports include an HDMI port, a USB port, an analog audio output port and an SD card port.

The master device further includes a DVD player.

The vehicle entertainment system further includes a second satellite device configured to play video content independent of video content played on the first satellite device or the master device.

DETAILED DESCRIPTION OF EXEMPLARY EMBODIMENTS

Disclosed herein is an interchangeable rear seat infotainment system according to an exemplary embodiment of the present invention.

In the infotainment system according to an exemplary embodiment of the present invention, users can create and securely log into their own wireless in-car rear-seat infotainment networks and share and stream media content across all occupants of the vehicle regardless of whether the content is stored and viewed on the EVO system or stored and viewed on a passenger's mobile device. The infotainment system accepts content from secure digital (SD) card and high-definition multimedia interface (HDMI)/universal serial bus (USB)-based devices, supports Miracast and digital living network alliance (DLNA) functionality, and features the ability to provide consumers with a live TV experience. For example, using the infotainment system, Slingbox users can connect through an in-car Wi-Fi hotspot and watch the same cable/satellite television package they have in their home including on-demand and previously recorded digital video recorder (DVR) content.

Some exemplary features of the infotainment system include: large (8", 10.1" and up), high resolution screens designed for Headrest, Seatback, Center Console and Overhead installations; digital Bluetooth connection to the vehicle's infotainment system for high-quality audio playback; traditional "D-Pad" mini remote and mobile smart device app control system facilitating control from a smartphone or directly from the vehicle's center stack; enhanced, intuitive user interface; portable device charging; smart device connectivity and content sharing; simplified vehicle integration with the ability to add the infotainment system to a vehicle independent of its existing controller area network (CAN); flexible architecture designed for feature expansion and updating to meet the changing mobile environment; distributed content playback which allows all screens and smart devices to view the same movie simultaneously.

Figure 1:
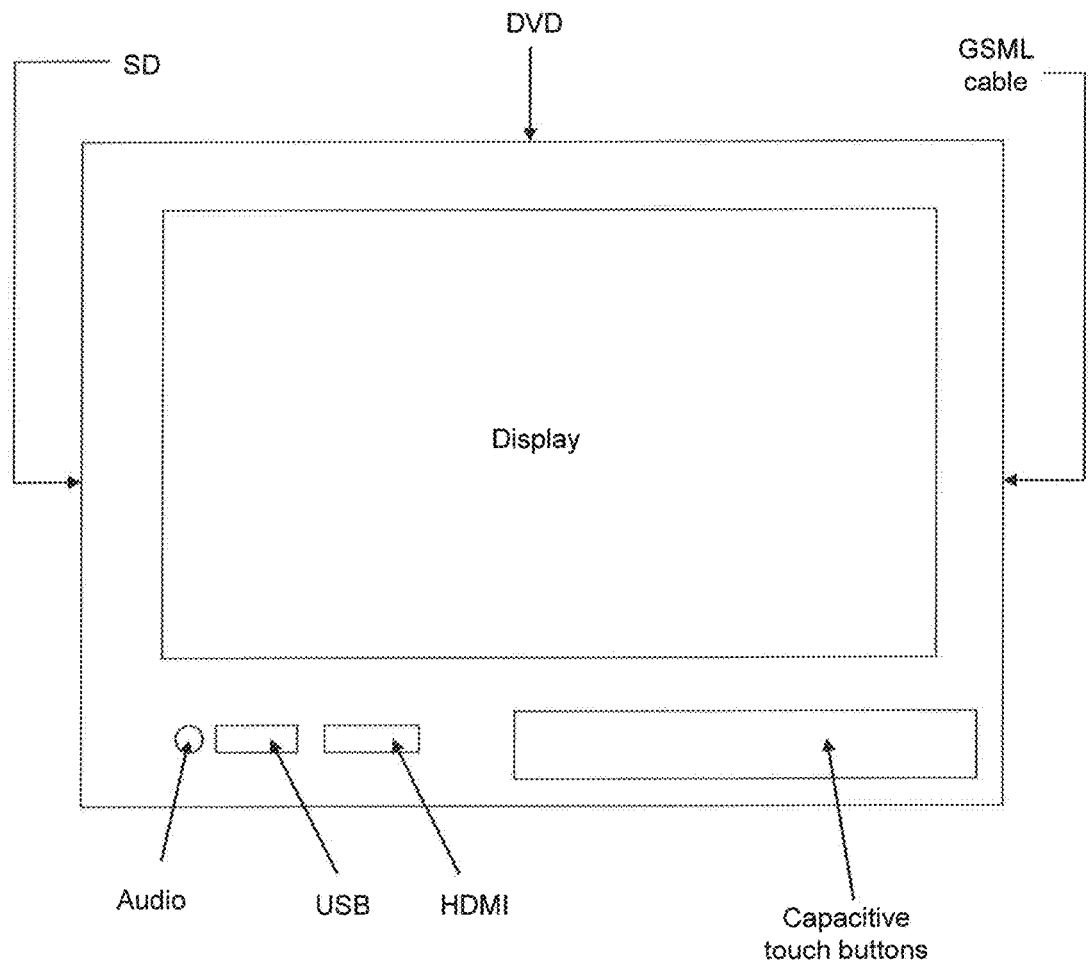
FIG. 1 illustrates a master device according to an exemplary embodiment of the present invention.
Figure 2:
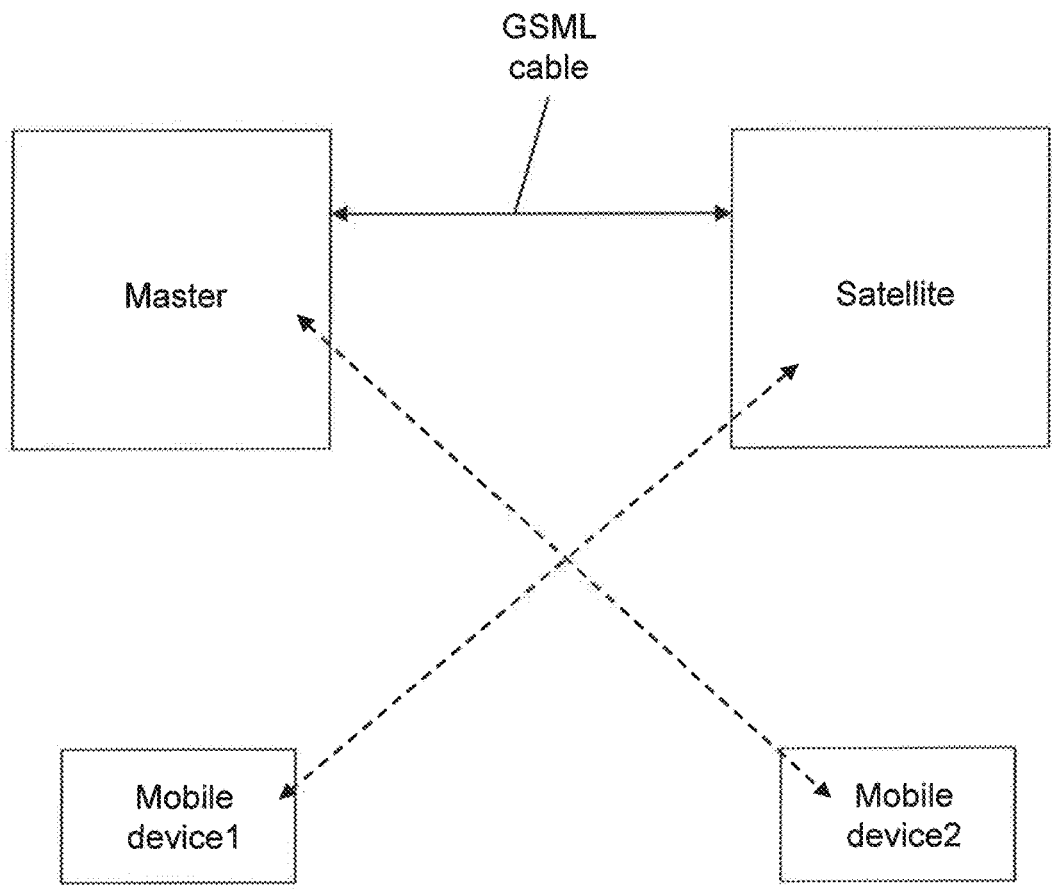
FIG. 2 illustrates a system including the master device, a satellite device and mobile devices according to an exemplary embodiment of the present invention.

The system architecture comprises two monitor types, Master and Satellite. FIG. 1 shows a Master, while FIG. 2 shows a Master and a Satellite. For example, FIG. 1 shows a Master that includes a display, a DVD player, an SD card port, an audio output port, a USB port, an HDMI port and capacitive touch buttons for control of a graphical user interface.

The individual monitor types of the infotainment are as follows: EVO 0—Display only (Satellite), EVO 4, (Master with no DVD) and EVO 5, (Master with DVD), for example. The system's wireless components integrate as EVO 5 & EVO 0, EVO 4 & EVO 0, or two EVO 5 monitors. The Master monitor (EVO 4 & EVO 5) are standalone. The EVO 0 (Satellite) must be used in conjunction with either EVO 4 or EVO 5. In other words, EVO 0 is an auxiliary component.

Each infotainment system may contain the following at a minimum: integrated Power Filter; a combination of any two system individual monitor types; a method to share audio/video between components; infrared (IR) Remote Control; IR Wireless Headphones, one for each monitor; and text to speech capability.

Each component may have its own feature set. In this disclosure, the term "component" may mean one of EVO 0, 4 and/or 5. Each system component has the ability to have their microcontroller (MCU) Firmware Profile flashed and software updated via a user accessible USB. Each component may have its own designation which will have its own fit form or function defined.

The following tables contain each system component designation and its feature matrix.

TABLE 1

EVO0 Feature Matrix

| Feature | Description |
|---|---|
| Display Panel | 1024x600 WSVGA High Resolution Display Panel |
| Audio | |
| Wired Headphones | 3.5 mm jack wired headphone output |
| IR Headphone Output | Analog IR headphones |
| System Control | |
| IR Remote Control | IR remote control of system |
| GMSL Connection | Used for system component interconnect |
| Low-Level microcontroller system | Basic microcontrollers needed for functions |

TABLE 2

EVO4 Feature Matrix

| Feature | Description |
|---|---|
| Display Panel | 1024x600 WSVGA High Resolution Display Panel |
| Connectivity | |
| USB 2.0 | USB 2.0 with support of FAT32 and charging. |
| MHL 2.0 with HDMI 1.4 | MHL 3.0 with HDMI Type A receptacle |
| SDXC | Secure Digital Card reader |
| Audio | |
| Audio hardwire Output | Adjustable gain differential or single ended audio |
| Wired Headphones | 3.5 mm jack wired headphone output |
| FM Transmitter | 98 channel |
| Bluetooth Audio profile (A2DP) | Bluetooth audio profile support |
| IR Headphone Output | Analog IR headphones |
| System Control | |
| IR Remote Control | IR remote control |
| Bluetooth profile AVRCP 1.5 | Bluetooth remote control with feedback |
| IP Remote control | IP remote control will be app based |
| Auxiliary Monitor Control | Control of EVO 0 |
| FCC Remote Control | Button To Speech function from remote |
| Digital media playback | |
| High-Level Processor | Multimedia Engine |
| Supported Files and Formats | Refer to Codec List. |
| Wireless Connectivity | |
| WLAN Network | Create and manage WLAN Access Point |
| Miracast Receiver | Miracast destination point |
| Multicast Streamer | Create a A/V media cast for multiple destinations |
| DLNA Renderer | DLNA destination point |

TABLE 3

EVO5 Feature Matrix
EVO5 Feature Matrix

| Feature | Description |
|---|---|
| Display Panel | High Resolution Display Panel Connectivity |
| DVD | DVD/CD loader |
| USB 2.0 | USB 2.0 with support of FAT32 and charging. |
| MHL 3.0 with HDMI 1.4 | MHL 3.0 with HDMI Type A receptacle |
| SDXC | Secure Digital Card reader |
| | Audio |
| Audio hardwire Output | Adjustable gain differential or single ended audio |
| Wired Headphones | 3.5 mm jack wired headphone output |
| FM Transmitter | 98 channel |
| Bluetooth Audio profile (A2DP) | Bluetooth audio profile support |
| IR Headphone Output | Analog IR headphones |
| | System Control |
| IR Remote Control | IR remote control |
| Bluetooth profile AVRCP 1.5 | Bluetooth remote control with feedback |
| IP Remote control | IP remote control will be app based |
| Auxiliary Monitor Control | Control of extension monitor |
| FCC Remote Control | Button To Speech function from remote |
| | Digital media playback |
| High-level Processor | Robust processing architecture |
| Multimedia Engine | Refer to agreed-upon Codec license listing |
| | Wireless Connectivity |
| WLAN Network | Create and manage WLAN Access Point |
| Miracast Receiver | Miracast destination point |
| Multicast Streamer | Create a A/V media cast for multiple destinations |
| DLNA Renderer | DLNA destination point |

A detailed description of certain elements of the above feature matrixes and/or other parts of the EVO 0, 4 and 5 monitors will now be described.

Processors and Decoders (EVO0)—may not have the ability to decode media content; may not have system-on-chip (SOC) or SOM architecture; may only have microprocessors needed to perform features of its feature Matrix.

(EVO4/5)—Full iMX6 based SOC or SOM may be used, e.g., iMX6 dual core Freescale SOC; have an operating system, e.g., Android 5.1; have a boot sequence; boot sequence starts once power is applied (e.g., vehicle ignition on) to the system component; capable of digital media playback.

USB Dedicated Charge Port (DCP)

USB type A receptacle shall be used. Power requirements support 10 watt charging criteria as outlined in USB Version 2.0 specification. Charging is enabled upon vehicle ignition being turned on. Charging device support fits the following criteria: supports Apple specification for iPhone charging; supports Apple specification for iPad charging; supports charging android phone devices; is able to reduce charging from 10 W upon demand to manage max current draw of the system (e.g., during temporary peak current draw conditions) and under low vehicle voltage conditions.

USB Charging Downstream Port (CDP)

USB 2.0 Read and Write—USB Version 2.0 specification compliant; USB type A receptacle shall be used; supports FAT32, NTFS, and exFAT file systems; USB feature supports both read and write as outlined in the USB 2.0 specification; supports up to a 1 TB USB drive.

USB Content sourcing—USB content is able to be sourced between system components; USB content sourced from another system component is able to play simultaneous on both system components without any A/V sync issues.

Mobile High-Definition Link (MHL)

MHL 2.0—MHL Version 2.0 specification compliant; MHL certified; HDMI Type A receptacle shall be used (e.g., 13.9 mm×4.45 mm); HDCP compliant; HDMI 1.4 compliant; charging shall support 10 watt device charging as outlined in MHL 2.0 specification.

Content sourcing—MHL content is able to be shared from EVO 4/5 to EVO 0; MHL content sourced from another system component shall be able to play simultaneously on both system components without any A/V sync issues.

HDMI

HDMI 1.4—version 1.4 specification compliant; HDMI certified; type A receptacle shall be used (e.g., 13.9 mm×4.45 mm); HDCP compliant.

Content sourcing—HDMI content is able to be shared from EVO 4/5 to EVO 0; HDMI content sourced EVO 4/5 to EVO 0 is able to play simultaneously on both system components without any A/V sync issues.

SD Card

SDXC (exFAT)—SDXC supports exFAT, NTFS, and FAT32 file systems; uses Standard SD Card receptacle (e.g., 32 mm×24 mm); supports read and write as outlined in the SDXC specification; supports a variety of file formats; supports up to a 512 GB SDXC card.

SDXC Content sourcing—SD content can be shared from EVO 4/5 to EVO 0; SD content sourced shared from EVO 4/5 to EVO 0 is able to play simultaneously on both system components without any A/V sync issues.

Wired Headphones

Receptacle—output receptacle shall use 3.5 mm TRRS phone connector; TRRS CTIA/AHJ standard compliant; contains a normally closed switch contact.

Audio output control—wired headphone audio output will have a volume control on the monitor display; wired headphone audio volume output shall be controlled by the remote control function and on screen display; wired Headphone audio volume output shall be controllable via an in-context audio selection in the player software, invoked by a "menu command"; shall support for apple in-line volume control enabled headphones. Example headphones are Klipsch R6i in-Ear Headphones; wired headphone audio output volume shall default to factory setting on any condition of a power cycle.

FM Transmitter

Can support 98 channel FM frequency, Channel resolution is 200 KHz; starting at 88.3 MHz; ending at 107.7 MHz.

Antenna shall route out of monitor assembly and be removable from the system component with VHC approved connector.

FM antenna can be included with the system component but is not necessary.

Functionality—shall be configured in firmware to be enabled and disabled on the system component according to system profiles; FM transmitter settings shall be available in a settings menu on the home screen; enabling and disabling the feature functionality shall be performed from the settings menu as well as an in-context audio selection in the player software, invoked by a "menu command"; changing FM frequency shall be performed from the settings menu as well as an in-context audio selection in the player software, invoked by a "menu command"; a hidden menu can be used to adjust the FM transmitter signal strength.

Bluetooth Connectivity

Bluetooth General Functionality—Bluetooth shall meet Specification v2.1+EDR at a minimum; Bluetooth settings shall be available in a settings menu on the home screen; enabling and disabling the feature functionality shall be performed from the settings menu as well as an in-context selection in the player software, invoked by a "menu command"; pairing Devices to the system shall be performed from the settings menu; Bluetooth connectivity shall work as a master device as outlined in the Bluetooth specification; Bluetooth connectivity shall also work as a slave device as outlined in the Bluetooth specification; feature shall be configured in firmware to be enabled and disabled on the system component according to system profiles.

Bluetooth Advanced Audio Distribution Profile (A2DP)

Bluetooth connectivity shall support stereo audio streaming to Bluetooth enabled devices via A2DP; Audio volume once paired shall default to 40 dB+−3 dB @ 1 kHz as measured at the drivers of headphones; Volume controls shall default to Bluetooth while Bluetooth is active; Volume changes made to any other audio output shall have no effect on the Bluetooth volume; Enabling wired headphones shall not disable Bluetooth A2DP; Enabling Bluetooth A2DP shall not disable wired headphones; Enabling IR headphones shall not disable Bluetooth A2DP; Enabling Bluetooth A2DP shall not disable IR headphones; Audio shall have the ability to compensate for the encoding/decoding delay and be synced with video within 10 microseconds; APT-X codec will be used to achieve low-latency.

Bluetooth Audio/Video Remote Control v 1.5 Profile (AVRCP)

Bluetooth connectivity shall support Audio/Video Remote Control v 1.5 Profile (AVRCP). The use of Bluetooth controls shall not disable IR controls. The use of IR controls shall not disable Bluetooth controls. Bluetooth controls shall perform the same functions as an IR remote control. Bluetooth QWERTY keyboard shall be supported anywhere text input in needed in the GUI.

IR Headphone

IR Analog Headphones shall be used with the following frequencies configured in firmware on the system component according to system profiles. For example, Master profile (EVO4/5): Left Channel 2.3 MHz, Right Channel 2.8 MHZ. For example, Satellite profile(EVO0): Left Channel 3.2 MHz, Right Channel 3.8 MHZ.

Enabling wired headphones shall not disable IR headphones. Enabling IR headphones shall not disable wired headphones. Enabling Bluetooth A2DP shall not disable IR headphones. Enabling IR headphones shall not disable Bluetooth A2DP. System component may have no IR headphone volume control. IR receiver may not be obstructed by any part of the system component in direct line of sight viewing position. IR Headphone output shall support the headphones.

IR Remote Control

NEC protocol shall be used. IR Remote shall have the ability to store two remote profiles on board, one for master system component and one for satellite system component. IR Remote shall be able to switch between remote profiles using Monitor A and Monitor B selection buttons. IR remote buttons shall support long press commands. IR remote output shall support the remote.

Audio Hardwired Output

Adjustable Gain Single Ended and Differential Audio—

Adjustable gain single ended audio shall be supported. Single ended gain shall have an adjustable range of 0V to 4V peak to peak and a resolution of 0.2 V. Setting of adjustable peak to peak voltage shall be configured in firmware.

Adjustable gain differential audio shall be supported. Differential audio gain shall have an adjustable range of 0V to 4V peak to peak and a resolution of 0.2 V. Setting of adjustable peak to peak voltage shall be configured in firmware.

Adjustable gain feature shall be configured in firmware to be enabled and disabled on the system component. Adjustable gain feature shall be configured in firmware to choose the audio type (single ended or differential).

Graphical User Interface (GUI) and On-Screen Display (OSD)

GUI may have the exact same visual appearance on all system components. GUI operation and layout may be exact same on all monitors. Navigation of GUI shall be handled by D pad arrows, select button, menu button and back button. All functions of the GUI shall be accessible in context specific OSD menus invoked with a menu button.

On screen QWERTY keyboard shall be supported anywhere text input in needed in the GUI. On screen QWERTY keyboard shall be handled by D pad arrows, select button, menu button and back button. From any status location in the GUI a press of the home button shall pause content playback and bring the GUI to the home screen. GUI shall support the following languages in all visible text to the end user: English, French, Spanish, Chinese (Both Traditional and Simplified), Arabic.

On-Screen Display (OSD)

OSD may have the exact same visual appearance on all monitors. OSD shall be context specific and only display content relevant to the current state of the device. OSD shall support the following languages in all OSD menus: English, French, Spanish, Chinese (Both Traditional and Simplified), Arabic.

Supported Files and Formats

Supported file formats, codecs and containers shall support those outlined below. For example, the infotainment system shall support the following formats: Video: AVI (Xvid, h.264/MPEG-4 Part 10 [AVC], MPEG/2/4); MPG/MPEG; VOB; MP4 Part 14 (MPEG4, h.264/MPEG-4 Part 10 [AVC]), MKV (h.264, h.264/MPEG-4 Part 10 [AVC], MPEG/2/4, VC-1), Photo: JPEG, BMP, PNG, Audio: MP3, ACC, WMA, MPEG-1, MPEG-2, AC-3, Subtitle: SRT, SSA, SUB The infotainment system can also support the following formats: Video: FLV (Sorenson H.263), TS/TP/M2T (MPEG1/2/4, AVC, VC-1), MOV (MPEG4, h.264/MPEG-4 0Part 10), M2TS, WMV9, Photo: TIF/TIFF, GIF, Audio: WAV, Dolby Digital Plus, OGG; MKA; FLAC; DTS, Playlist: M3U.

WLAN

WLAN functionality shall be Wi-Fi certified. Infotainment device shall have the ability to create and control a unique WLAN network with a unique SSID (Access Point Mode; AP mode). WLAN SSID shall broadcast and be able to be joined by devices with supported network and encryption standards. Infotainment device can work in only one mode at a time (AP, Client Mode). Infotainment device shall have the ability to switch between AP mode and Client mode by the end user via the settings menu. Client mode shall be activated or deactivated by a toggle or radio button in the wireless section of the settings.

WLAN network shall assign internet protocol addresses (IP address) according to IPv4 standard via a DHCP server. WLAN shall be able to connect and manage Wi-Fi capable devices while in AP mode without limitation to how many.

WLAN will deny access to the AP once 10 Wi-Fi capable devices have successfully connected. If access is denied WLAN shall alert devices trying to connect to the AP after it has meet its limit with clear language indicating the limit has been meet. WLAN network shall operate simultaneously in dual band mode in the 2.4 GHz and 5 GHz frequency band. WLAN and Wifi Direct (Miracast) shall be Real time Simultaneous dual band.

Concurrent WiFi Direct and Access Point Services. Example configuration: WLAN SSID shall be configured in firmware on the system component. All WLAN AP settings shall be configured in firmware on the system component. WLAN AP settings shall have the ability to be managed via a web interface.

Encryption: Supported Encryption types: WLAN may support network access via 64-bit WEP. WLAN may support network access via 128-bit WEP. WLAN shall support network access via WPA-PSK. WLAN shall support network access via WPA2-PSK. General Encryption features: Encryption shall be configured in firmware. Encryption password shall be configurable by the end user via the settings menu. WLAN shall maintain a log of all previously authenticated Wi-Fi capable devices by main access control address (MAC) and allow reconnection of these devices without the need for re-authentication.

Networking standards: Shall support IEEE 802.11n-2009. Shall support IEEE 802.11g-2003. Shall support IPv4. Shall support IPv6.

Data Rate: WLAN network shall have a minimum optimal data rate (Herby: MODR) suitable to stream up to 2 high definition video streams and receive commands from 2 ip-remotes in all frequency bands supported. Wireless network data rates shall be support desired use cases.

Coverage: WLAN coverage in all supported frequency bands to reach all devices inside the vehicle.

Network utilities: WLAN shall support Wi-Fi Multimedia (WMM). WLAN shall support Quality of Service Utility (QoS). Infotainment network will not block UPnP, DLNA, and Multicast.

Miracast Receiver

Miracast receiver functionality shall be Wi-Fi Alliance certified. Miracast functionality shall act as a Miracast receiver (WFD Sink) as specified in Wi-Fi Display Technical Specification Version 1.1. Miracast receiver functionality shall be HDCP 2.1 compliant.

General features: Miracast shall support both Audio and Video transmission. Miracast shall be configured in firmware on the system component. Miracast shall be a source input represented and selectable in all source input locations in the GUI. Miracast functionality shall not disrupt the status of any other device feature unless otherwise stated. Miracast shall perform the exact same regardless the mode the WLAN feature is in (AP or Client mode). WLAN and (Miracast) shall be Real time Simultaneous dual band.

Concurrent Access Point Services. Miracast Content sourcing: Miracast content shall be able to be sourced between system components. Miracast content sourced from another system component shall be able to play simultaneously on both system components without any A/V sync issues.

Multicast Streamer

Multicast General features: Multicast shall support a one-to-many network assisted distribution method. Multicast may perform its group communication using RTSP, RTP, RTCP, +Unicast. Multicast may perform its group communication using IP multicasting. Multicast functionality shall not stream protected content without the required Digital Rights Management (DRM) and content protection for said content. Multicast content shall be restricted to displaying only the content that is being played on the system component the stream is originating from. Multicast shall function the exact same regardless the mode the WLAN feature is in (AP or Client mode). Multicast shall always be enabled and streaming compatible content being played on multicast enabled system component to the available group. Multicast stream shall use a file format and codec that is universally playable from all iOS and Android devices. Multicast streaming shall be accessible from co developed applications for iOS and Android devices.

Multicast Content sourcing: Multicast content shall be able to be sourced by up to 2 devices connected to the active network the system component is connected to. All Multicast content streamed on compatible devices shall be able to play simultaneously without any A/V sync issues. Device-to-device latency shall be Xms maximum. All Multicast content streamed on compatible devices shall be able to play simultaneously without any A/V sync issues among all devices streaming the content. Device-to-device latency shall be Xms maximum.

Monitor Sharing

Monitor sharing makes content being displayed on one system component available to another. Monitor sharing does this by displaying all content being rendered on the source system component to the screen of a connected system component through a wired connection, for example.

Full Monitor Sharing

Full Monitor Sharing mode shall be configured in firmware on the system component. Only content which is being actively viewed on the source system component shall be shared to the other system component. Content being sourced from one source to another shall have no latency in the Video and Audio feed. Device to Device Latency shall be Xms maximum. If content is unavailable for streaming the "monitor sharing" source shall be greyed out and not selectable on the home screen. If a stream becomes unavailable during playback a screen informing the user of the error shall be displayed for 15 seconds then return to the home screen.

Auxiliary Monitor Control

Auxiliary monitor control enables an equipped system component to extend its feature set to an extension mode system component. System components which control extension monitors shall have enough resources to comfortably control two system components user experience and have resources to spare. Equipped system components referred in this section as "Master."

Master shall power up automatically after switched power is applied. Control of both system components shall be identical, independent and controlled by Masters. All Masters equipped and configured I/O shall be available to both system components. Masters shall update attached extension mode firmware via GMSL de-serializer low level line during update procedure. The UX/UI of both system components shall be exactly the same.

Sources which are independent in nature (e.g. HDMI, DVD, etc.) may be limited to single input source. E.g., Master is equipped with HDMI and extension is not, only one HDMI source is available to be sourced from both system components. Sources which are not independent in nature (e.g. USB, SD, etc.) shall not be limited to single input source. E.g., Master is equipped with USB and extension is not. Multiple movies stored on the USB device shall be available to play independently on Master and extension.

Master shall interpret commands sent via the low level GMSL communication and execute actions. E.g., Extension is equipped with IR receiver for remote control commands. Any commands are to be passed to Master for execution of extension UX/UI.

DLNA

System components with DLNA enabled shall be DLNA certified.

Digital Media Renderer—A digital media renderer is a device used in the DLNA protocol as a content sink. Renderers are sinks that can play music, videos and pictures sent to it from a media controller. A renderer is not able to browse for media on network media servers. A system component shall be certified as a DLNA renderer. DLNA renderer shall be accessible from the home screen as a source (UI dependency). DLNA renderer shall be configured in firmware on the system component.

Referring now to FIGS. 1 and 2 and the discussion above, it can be seen that the Master (e.g., EVO 4 or 5) can receive a variety of content from a variety of sources. Moreover, the Master can distribute this content to a variety of destinations. For example, by virtue of its I/O connectivity, the Master can receive audio/video content via its USB port and HDMI/HML port. The Master can also receive audio/video content from an SD card, DVD or WiFi connection. This content can then be stored at the Master and/or distributed to other electronic components. This distribution may occur via a wired connection (e.g., GSML cable in FIG. 2) or wirelessly. Content may be transferred in a high-speed, high definition digital media manner.

For example, as shown in FIG. 2, content may be wirelessly provided to mobile devices 1 and 2 (e.g., smartphones, tablets, etc.). The Master may provide content to one or both of the mobile devices 1 and 2. This content may be provided wirelessly, independently and/or simultaneously. Similarly, the Satellite may provide content to one or both of the mobile devices 1 and 2. This content may be provided wirelessly, independently and/or simultaneously. In other words, the infotainment system according to an exemplary embodiment of the present invention has the ability to share multiple content streams to any screen in the vehicle. The infotainment system according to an exemplary embodiment of the present invention can integrate with vehicle built-in screens as well as tablets and smartphones. Moreover, by using the infotainment system according to an exemplary embodiment of the present invention—content from one device (e.g., Mobile device 1) can be shared with another device (e.g., Mobile device 2) thru the Master. In this way, the Mater functions as an access point or a hub, for example.

For example, the mobile device 1 and the Master may share content bi-directionally thru DLNA. Further, the Master may Miracast content from the mobile device 2. Further, the mobile devices 1 and 2 may have an app that enables them to control all functionality of the Master. This control may be done via Bluetooth, for example. In addition, the mobile devices 1 and 2 may be physically wired to the Master to display selected content on the Master's screen. That selected content may also be mirrored to the Satellite's screen. Further, the Master may access both live TV and recorded home cable/satellite TV and stream this to the mobile devices 1 and 2 as well as the Satellite thru an in-car WiFi network, for example.

The GUI on the Master's screen may be used to bring content into the vehicle from the home (e.g., via a WiFi connection), to set up screen monitoring and/or to set up content streaming. For example, via the GUI, a user may select content from the SD Card and share this content to the Satellite. Further, via the GUI, a user may enter a playback mode to watch something playing on the Master on the mobile device, or make this content play on more than one electronic device.

Figure 3:
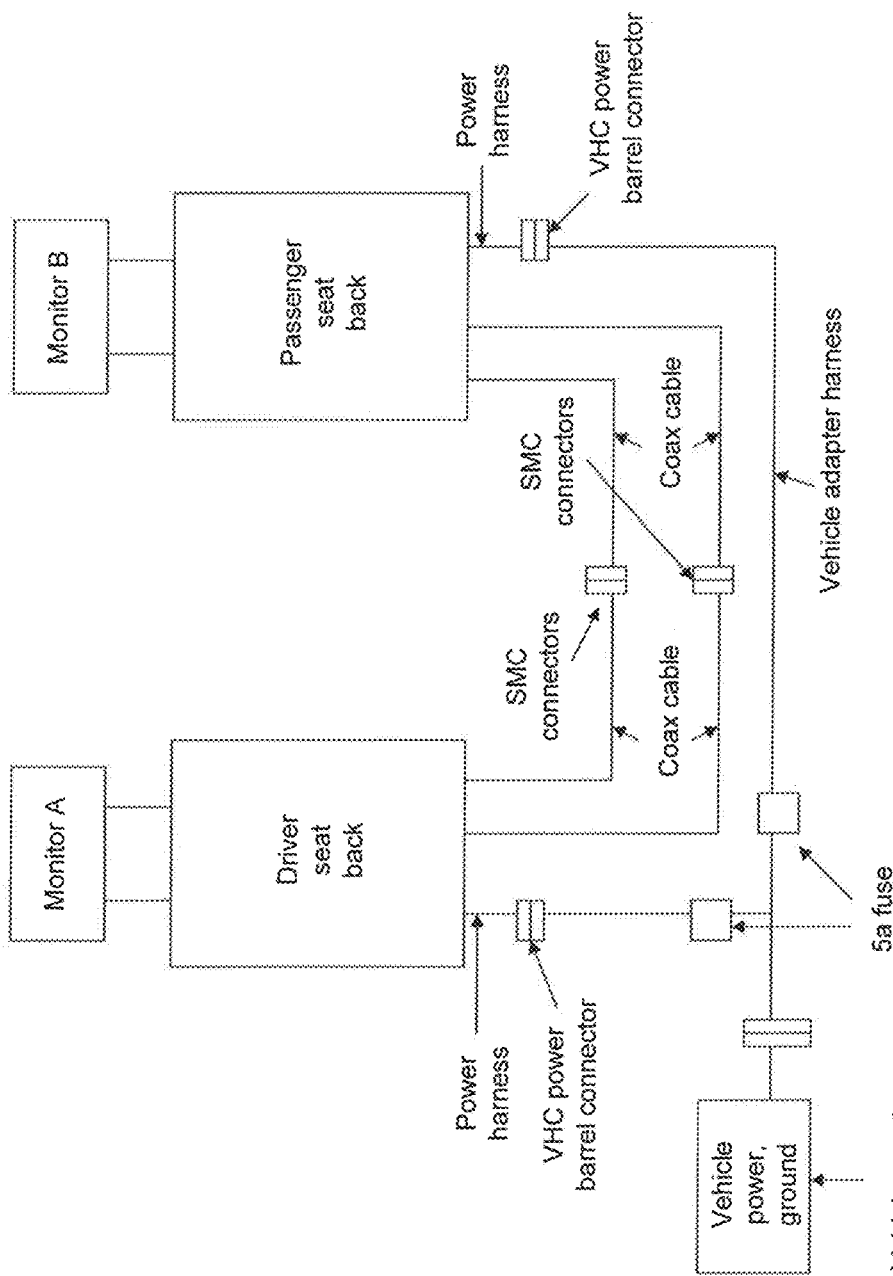
FIG. 3 illustrates a wiring diagram of a system according to an exemplary embodiment of the present invention.

FIG. 3 illustrates a wiring diagram of a system according to an exemplary embodiment of the present invention. In FIG. 3, Monitor A may be the Master device and Monitor B may be the Satellite device; however, the present invention is not limited thereto. At least one of the coax cables may be the GSML cable, for example.

Figure 4:
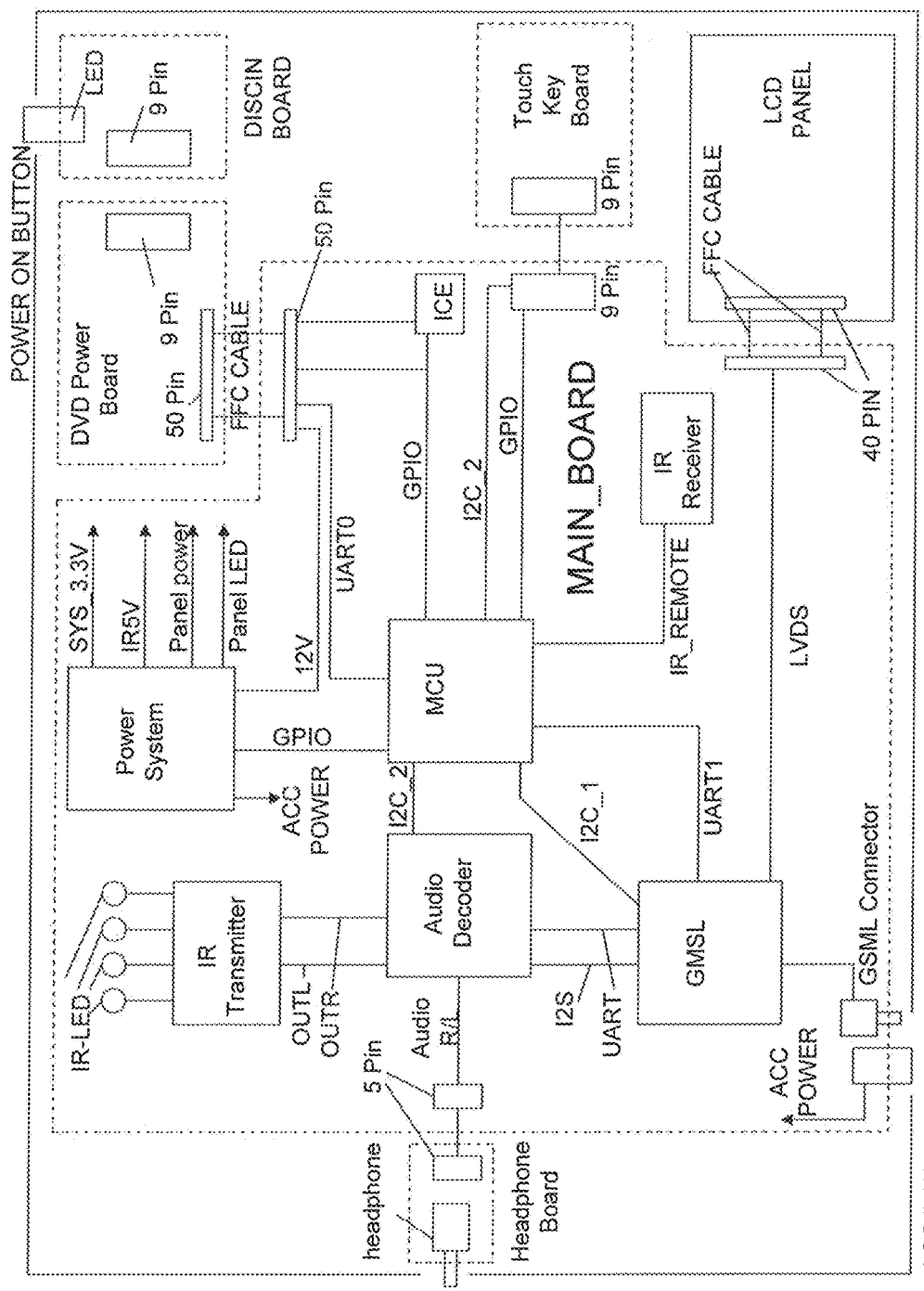
FIG. 4 is a circuit diagram of a satellite device according to an exemplary embodiment of the present invention.

FIG. 4 is a circuit diagram of a satellite device according to an exemplary embodiment of the present invention. The satellite device may include the circuit elements in Table 4 to implement the features described above therefor.

TABLE 4

| M0516LDN | MCU |
| FM-3038TM2-5DN | IR-RECEIVER |
| MAX9278 | GMSL |
| MAX9850 | AUDIO DECODER |
| AST0222DE | IR TRANSMITTER |

Figure 5A:
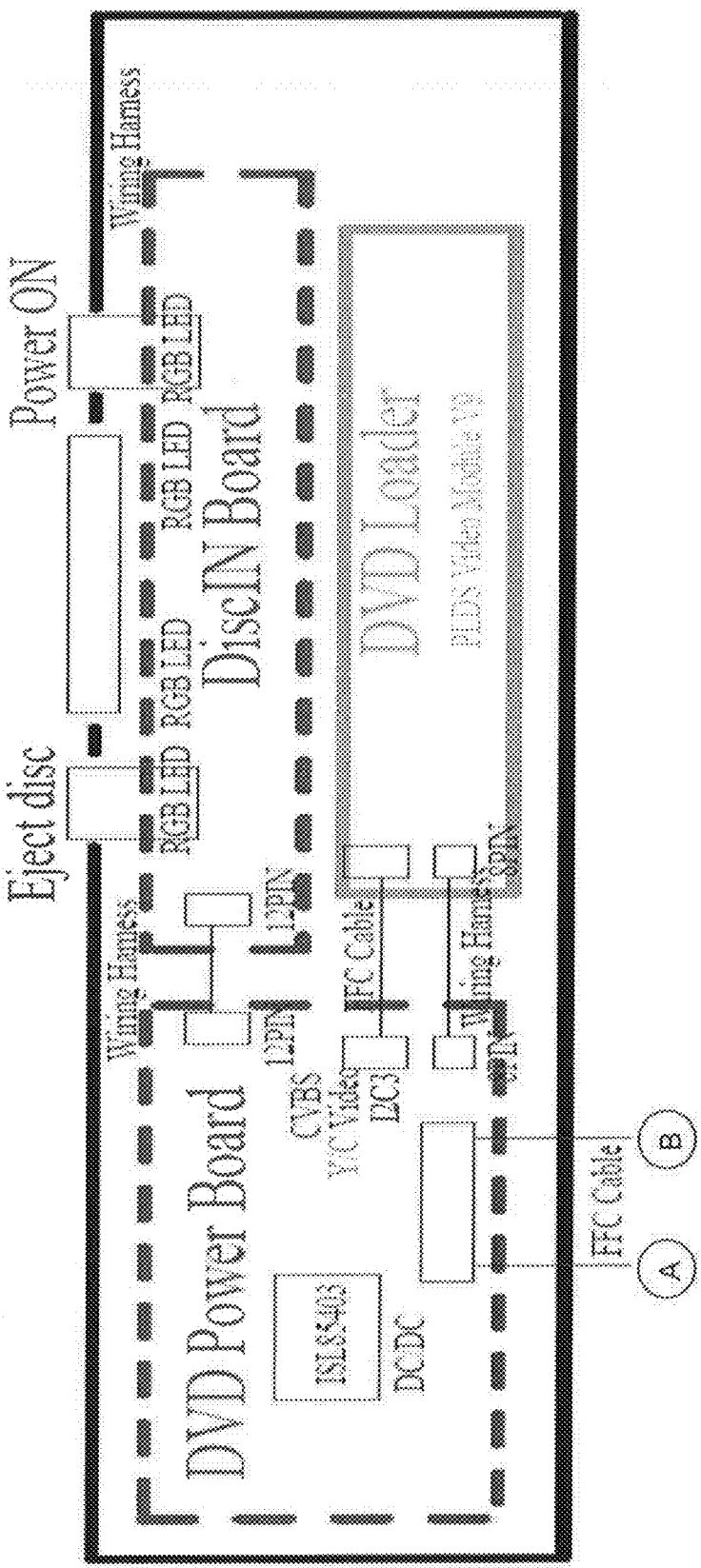
FIGS. 5A and 5B show a circuit diagram of a master device according to an exemplary embodiment of the present invention.
Figure 5B:
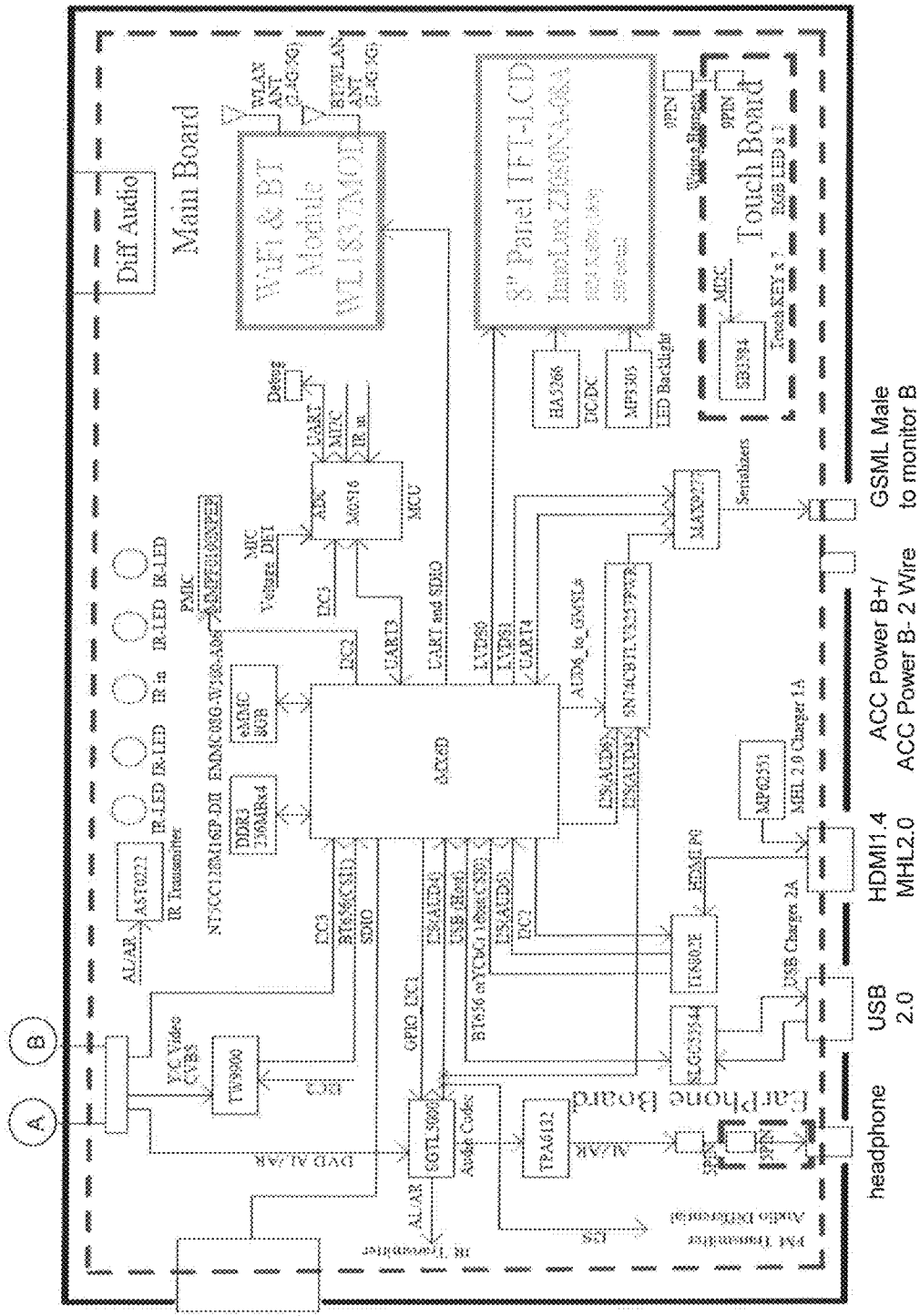

FIGS. 5A and 5B show a circuit diagram of a master device according to an exemplary embodiment of the present invention. The master device may include the circuit elements in Table 5 to implement the features described above therefor.

TABLE 5

| iMX6D | Application processor |
| AST0222 | IR Transmitter |
| TW9900 | Y/C Video CVBS |
| NT5CC128M16IP-DII | DDR 3 |
| EMMC08G-W100-A06 | eMMC 8 Gb |
| WL1837MOD | Wifi & BT Module |
| M0516 | MCU |
| SGTL5000 | Audio Codec |
| TPA6132 | AUDIO AMP headphone 2 CH |
| SN74CBTLV3257PWR | Low Voltage |
| HA5266 | Multiplexer/Demultiplexer |
| MP3305 | LED BACKLIGHT |
| InnoLux ZJ080NA-08A | TFT-LCD 8" Panel |
| MAX9277 | Serializers |
| MP62551 | MHL 2.0 Charger 1A |
| IT6802E | HDMI PO |
| SLGC55544 | USB IC |

Although the present invention has been shown and described with reference to exemplary embodiments thereof, it is understood by those of ordinary skill in the art that various changes in form and detail can be made thereto without departing from the spirit and scope of the present invention as hereinafter claimed.

What is claimed is:

1. A rear seat entertainment system, comprising:
a first access point, wherein the first access point includes a first display screen and a plurality of input/output ports, wherein the first access point is included in a first housing, wherein the first housing is configured to mount to a first vehicle seat; and
a second housing separate from the first housing, wherein the second housing includes a second display screen housing is configured to mount to a second vehicle seat, wherein the first access point is configured to display first content on the first display screen and stream the first content displayed on the first display screen to the second housing so that the first content is simultaneously displayed on the first and second display screens, wherein the first access point is further configured to receive second content from a first mobile device, display the second content on the first display screen and stream the second content displayed on the first display screen to the second housing so that the second content is simultaneously displayed on the first and second display screens, wherein the first access point is configured to create and control a wireless local area network and be switched between an access point mode and a client mode by a user via a settings menu accessible in a graphical user interface on the first display screen, wherein the first access point includes a context caster configured in firmware on a system component, the content caster being a source input represented and selectable on source input locations in the graphical user interface, the content caster configured to stream the second content to the second housing in the access point mode and the client mode, wherein the content caster is configured, to perform group communication using a real-time transport protocol and permit more than two devices to source content therefrom if the more than two devices are communicably coupled to the first access point through the wireless local area network.

2. The rear seat entertainment system of claim 1, wherein the first and second housings are each configured to be disposed inside a vehicle seat headrest.

3. The rear seat entertainment system of claim 1, wherein the plurality of input/output ports include a high-definition multimedia. interface (HDMI) port, a universal serial bus (USB) port, an analog audio output port and a secure digital (SD) card port.

4. The rear seat entertainment system of claim 1, wherein the first access point further includes a digital. video disc (DVD) player.

5. The rear seat entertainment system of claim 1, further comprising an infrared remote control.

6. The rear seat entertainment system of claim 1, wherein the first access point is further configured to stream the first content displayed on the first display screen to the first mobile device so that the first content is simultaneously displayed on the first display screen, and a third display screen of the first mobile device.

7. The rear seat entertainment system of claim 6, wherein the first access point is further configured to stream the first content displayed on the first display screen to a second mobile device so that the first content is simultaneously displayed on the first display screen, the third display screen of the first mobile device, and a fourth display screen of the second mobile device.

8. The rear seat entertainment system of claim 1, wherein the first mobile device is a smartphone or a tablet.

9. The rear seat entertainment system of claim 1, wherein the second housing includes a second access point, wherein the second access point is configured to stream third content to a second mobile device so that the third content is displayed on a third display screen of the second mobile device.

10. A vehicle entertainment system, comprising:
a master device, the master device including a first display screen and a plurality of input/output ports; and
a first satellite device, the first satellite device including a second display screen, wherein the master device is configured to receive a hardwired connection via one of the plurality of input/output ports from a first portable device, receive first video content from the first portable device through the hardwired connection, display the first video content on the first display screen and stream the first video content to the second display screen, wherein the master device is further configured to wirelessly stream the first video content to a second mobile device, wherein the master device is further configured to create and control a wireless local area network and be switched between an access point mode and a client mode by a user via a settings menu accessible in a graphical user interface on the first display screen, wherein the master device includes content caster configured in firmware on a system component, the content caster being a source input represented and selectable on source input locations in the graphical user interface, the content caster configured to stream the first video content to the second mobile device in the access point mode and the client mode, wherein the content caster is configured to perform group communication using a real-time transport protocol and permit more than two devices to source content therefrom if the more than two devices are communicably coupled to the master device through the wireless local area network.

11. The vehicle entertainment system of claim 10, wherein the master device and the satellite device are each configured to be disposed inside a vehicle seat headrest.

12. The vehicle entertainment system of claim 10, wherein the master device and the first satellite device are each configured to be mounted to a vehicle seat.

13. The vehicle entertainment system of claim 10, wherein the master device is further configured to receive second video content via the wireless local area network and wirelessly stream the second video content to the first mobile device or the second mobile device.

14. The vehicle entertainment system of claim 10, wherein content streaming operations of the master device are controllable with the first or second mobile devices.

15. The vehicle entertainment system of claim 10, wherein the wireless local area network is a dedicated in-car wireless network.

16. The vehicle entertainment system of claim 10, wherein at least one of the first mobile device and the second mobile device is a smartphone or a tablet.

17. The vehicle entertainment system of claim 10, wherein the master device further includes a plurality of input/output ports, wherein the plurality of input/output ports include a high-definition multimedia interface (HDMI) port, a universal serial bus (USB) port, an analog audio output port and a secure digital (SD) card port.

18. The vehicle entertainment system of claim 10, wherein the master device further includes a digital video disc (DVD) player.

19. The vehicle entertainment system of claim 10, further comprising a second satellite device configured to play video content independent of video content played on the first satellite device or the master device.

* * * * *